United States Patent
Brown (10) Patent No.: US 11,865,489 B2
(45) Date of Patent: Jan. 9, 2024

(54) FILTER ELEMENT WITH FLUTED FILTER MEDIA

(71) Applicant: Donaldson Company, Inc., Minneapolis, MN (US)

(72) Inventor: Scott M. Brown, Faribault, MN (US)

(73) Assignee: Donaldson Company, Inc., Minneapolis, MN (US)

(*) Notice: Subject to any disclaimer, the term of this patent is extended or adjusted under 35 U.S.C. 154(b) by 628 days.

(21) Appl. No.: 17/046,100

(22) PCT Filed: Apr. 8, 2019

(86) PCT No.: PCT/US2019/026340
§ 371 (c)(1),
(2) Date: Oct. 8, 2020

(87) PCT Pub. No.: WO2019/199676
PCT Pub. Date: Oct. 17, 2019

(65) Prior Publication Data
US 2021/0031133 A1 Feb. 4, 2021

Related U.S. Application Data (60) Provisional application No. 62/654,909, filed on Apr. 9, 2018.

(51) Int. Cl.
*B01D 46/52* (2006.01)
*B01D 29/01* (2006.01)
(Continued)

(52) U.S. Cl.
CPC ......... *B01D 46/526* (2013.01); *B01D 29/012* (2013.01); *B01D 29/031* (2013.01);
(Continued)

(58) Field of Classification Search
CPC .......... B01D 46/525–527; B01D 46/521–523; B01D 46/0001; B01D 2271/02;
(Continued)

(56) References Cited

U.S. PATENT DOCUMENTS

| | | | |
|---|---|---|---|
| 2,936,855 | A | 5/1960 | Allen et al. |
| 4,268,290 | A | 5/1981 | Barrington |

(Continued)

FOREIGN PATENT DOCUMENTS

| | | | |
|---|---|---|---|
| CN | 1678383 A1 | 10/2005 | |
| CN | 101189056 A1 | 5/2008 | |

(Continued)

OTHER PUBLICATIONS

International Patent Application No. PCT/US2019/026340, filed Apr. 8, 2019; International Search Report / Written Opinion dated Sep. 2, 2019; 16 pages.

(Continued)

*Primary Examiner* — Robert Clemente
(74) *Attorney, Agent, or Firm* — Mueting Raasch Group (57) ABSTRACT

A filter element has a sheet of filter media having a first elongate edge and a second elongate edge. The sheet of filter media defines a plurality of pleats, a first set of pleat folds and a second set of pleat folds, where each of the plurality of pleats extend between the first set of pleat folds and the second set of pleat folds. The first set of pleat folds each extend from the first elongate edge to the second elongate edge, and the second set of pleat folds each extend from the first elongate edge to the second elongate edge. Each of the plurality of pleats defines a repeating wave pattern of flute peaks and flute valleys alternating from the first set of pleat folds to the second set of pleat folds. Each of the flute peaks and flute valleys extend from the first elongate edge to the second elongate edge.

20 Claims, 7 Drawing Sheets

(51) Int. Cl.
*B01D 29/03* (2006.01)
*B01D 46/00* (2022.01)

(52) U.S. Cl.
CPC ....... *B01D 46/0001* (2013.01); *B01D 46/523* (2013.01); *B01D 2201/127* (2013.01); *B01D 2201/34* (2013.01); *B01D 2271/02* (2013.01)

(58) Field of Classification Search
CPC ................ B01D 29/012; B01D 29/031; B01D 2201/127; B01D 2201/34
See application file for complete search history.

(56) References Cited

U.S. PATENT DOCUMENTS

| | | | |
|---|---|---|---|
| 4,925,561 A | 5/1990 | Ishii et al. | |
| 5,066,400 A | 11/1991 | Rocklitz et al. | |
| 6,375,700 B1 | 4/2002 | Jaroszczyk et al. | |
| 6,482,247 B2 | 11/2002 | Jaroszczyk et al. | |
| 7,323,105 B1 | 1/2008 | Janikowski et al. | |
| 9,108,394 B2 | 8/2015 | Moe et al. | |
| 2002/0100263 A1* | 8/2002 | Jaroszczyk | B01D 46/121 55/482 |
| 2006/0065592 A1 | 3/2006 | Terres et al. | |
| 2006/0151383 A1* | 7/2006 | Choi | B01D 46/0001 210/493.1 |
| 2006/0272305 A1* | 12/2006 | Morgan | B01D 25/26 55/521 |
| 2008/0276582 A1* | 11/2008 | Boehrs | B01D 46/0005 55/497 |
| 2008/0307759 A1* | 12/2008 | Reichter | B01D 46/0005 55/502 |
| 2009/0151311 A1* | 6/2009 | Reichter | F02C 7/05 55/497 |
| 2009/0211696 A1 | 8/2009 | Moe et al. | |
| 2011/0186504 A1* | 8/2011 | Rocklitz | B01D 46/525 210/493.1 |
| 2017/0216757 A1 | 8/2017 | Ouyang et al. | |

FOREIGN PATENT DOCUMENTS

| | | |
|---|---|---|
| CN | 102119049 A | 7/2011 |
| CN | 105148614 A | 12/2015 |
| CN | 106687194 A | 5/2017 |
| DE | 102014008704 B3 | 12/2015 |
| WO | WO 2004/007054 A1 | 1/2004 |
| WO | WO 2006/132717 A2 | 12/2006 |
| WO | WO 2009/100067 A1 | 8/2009 |
| WO | WO 2016/019307 A1 | 2/2016 |

OTHER PUBLICATIONS

International Patent Application No. PCT/US2019/026340, filed Apr. 8, 2019; International Preliminary Report on Patentability dated Oct. 13, 2020; 11 pages.

* cited by examiner

FILTER ELEMENT WITH FLUTED FILTER MEDIA

CROSS-REFERENCE TO RELATED APPLICATIONS

This application is the § 371 U.S. National Stage of International Patent Application No. PCT/US2019/026340, filed 8 Apr. 2019, which claims the benefit of U.S. Provisional Patent Application No. 62/654,909, filed 9 Apr. 2018, the disclosures of which are incorporated by reference herein in their entireties.

FIELD OF THE TECHNOLOGY

The technology disclosed herein generally relates to fluted media. More particularly, the technology disclosed herein relates to a filter element with a fluted media pack.

SUMMARY

A filter element has a sheet of filter media having a first elongate edge and a second elongate edge. The sheet of filter media defines a plurality of pleats, a first set of pleat folds and a second set of pleat folds, where each of the plurality of pleats extend between the first set of pleat folds and the second set of pleat folds. The first set of pleat folds each extend from the first elongate edge to the second elongate edge, and the second set of pleat folds each extend from the first elongate edge to the second elongate edge. Each of the plurality of pleats defines a repeating wave pattern of flute peaks and flute valleys alternating from the first set of pleat folds to the second set of pleat folds. Each of the flute peaks and flute valleys extend from the first elongate edge to the second elongate edge.

In some embodiments, the first elongate edge and the first set of pleat folds defines first flow faces, and the second elongate edge and the second set of pleat folds defines second flow faces. In some such embodiments, the filter element has a diagonal gasket sealably disposed between the first flow faces and the second flow faces. Additionally or alternatively, the sheet of filter media has a first surface and a second surface, and the filter element further has a first sealing bead on the first surface and extending along the first elongate edge and a second sealing bead on the second surface and extending along the second elongate edge. Additionally or alternatively, the diagonal gasket contacts the first sealing bead and the second sealing bead. Additionally or alternatively, the flutes and pleat folds are parallel. Additionally or alternatively, the first set of pleat folds defines a curved plane. Additionally or alternatively, a plurality of pleat spacers extend between adjacent pleat folds. Additionally or alternatively, a support strip extending across a plurality of flute peaks.

Methods of forming a filter element is also described. An elongate sheet of filter media is passed between two rollers in a machine direction of the media to form flute peaks and flute valleys that alternate in the machine direction. A first sealing bead is deposited along a first elongate edge of the filter media on a first surface. A second sealing bead is deposited along a second elongate edge of the filter media on a second surface. The elongate sheet of filter media is pleated to have a plurality of pleats extending between a first set of pleat folds and a second set of pleat folds, where the first set of pleat folds and the second set of pleat folds extend in a cross-machine direction relative to the sheet of filter media.

In some embodiments, each of the flute peaks and flute valleys extend in the cross-machine direction. Additionally or alternatively, the pleat folds, the flute peaks, and the flute valleys are parallel. Additionally or alternatively, a gasket is applied diagonally across a first pleat and a last pleat of the plurality of pleats in the filter element. In some such embodiments, the gasket is applied across a first series of pleat fold ends defined by the first set of pleat folds and across a second series of pleat fold ends defined by the second set of pleat folds. In some such embodiments, the gasket is applied by positioning a mold across the first pleat and the last pleat and across the first series of pleat fold ends and second series of pleat fold ends, and dispensing gasketing material into the mold. Additionally or alternatively, a support strip is coupled to each of a plurality of the flute peaks. Additionally or alternatively, a plurality of pleat spacers is inserted between adjacent pleat folds.

In some embodiments, the filter element is described that has a first flow face defining a first plurality of flute openings and a first plurality of flute closures. The filter element has a second flow face opposite the first flow face, where the second flow face defines a second plurality of flute openings and a second plurality of flute closures. A first plurality of flutes extends from the first plurality of flute openings to the second plurality of flute closures and a second plurality of flutes extends from the second plurality of flute openings to the first plurality of flute closures. A third flow face is perpendicular to the first flow face and second flow face, where the third flow face defines a plurality of openings in direct fluid communication with the first plurality of flutes. A fourth flow face is opposite the third flow face, where the fourth flow face is perpendicular to the first flow face, and the second flow face and the fourth flow face defines a plurality of openings in direct fluid communication with the second plurality of flutes. A gasket is configured to sealably separate the first flow face and the third flow face from the second flow face and the fourth flow face.

In some such embodiments, the gasket defines a plane that lies at a 45-degree angle to the first flow face, the second flow face, the third flow face, and the fourth flow face. Additionally or alternatively, a sheet of filter media has a first elongate edge and a second elongate edge, where the sheet of filter media defines a plurality of pleats, a first set of pleat folds and a second set of pleat folds, and each of the plurality of pleats extend between the first set of pleat folds and the second set of pleat folds. Additionally or alternatively, the first set of pleat folds each extend from the first elongate edge to the second elongate edge and the second set of pleat folds each extend from the first elongate edge to the second elongate edge. Additionally or alternatively, the first elongate edge defines the first flow face, the first set of pleat folds defines the third flow face, the second elongate edge defines the second flow face, and the second set of pleat folds defines the fourth flow face. Additionally or alternatively, the sheet of filter media has a first surface and a second surface, and the filter element has a first sealing bead on the first surface extending along the first elongate edge and a second sealing bead on the second surface extending along the second elongate edge. Additionally or alternatively, the gasket contacts the first sealing bead and the second sealing bead. Additionally or alternatively, the flutes and pleat folds are parallel. Additionally or alternatively, the first set of pleat folds define a curved plane. Additionally or alternatively, the filter element has a plurality of pleat spacers extending between adjacent pleat folds. Additionally or alternatively, the filter element has a support strip extending across a plurality of flute peaks.

BRIEF DESCRIPTION OF THE DRAWINGS

The current technology may be more completely understood and appreciated in consideration of the following detailed description of various embodiments of the current technology in connection with the accompanying drawings.

DETAILED DESCRIPTION

Figure 1:
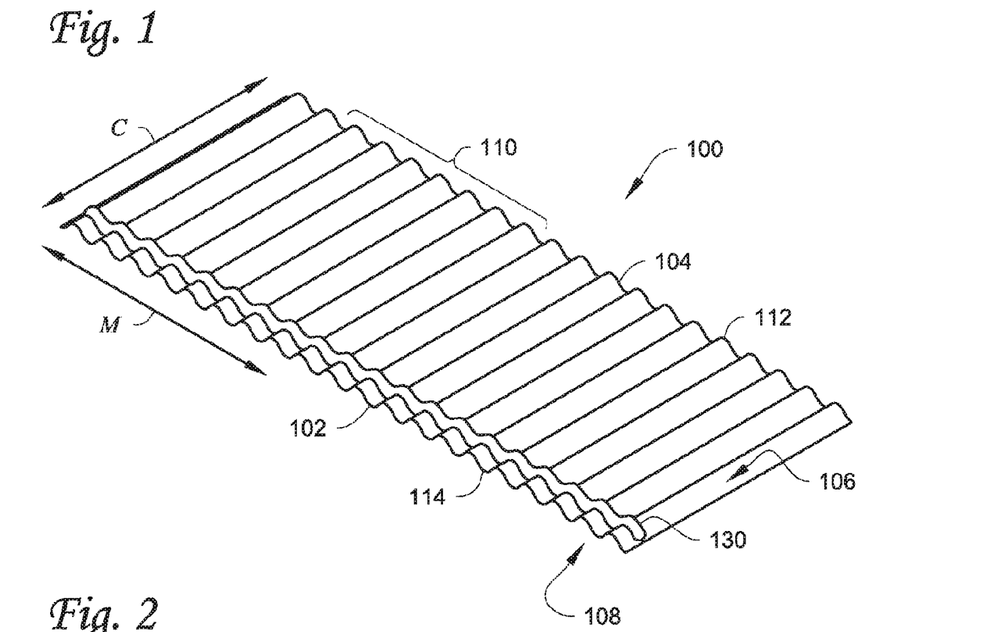
FIG. 1 is an example sheet of filtration media consistent with some examples of the technology disclosed herein.
Figure 2:
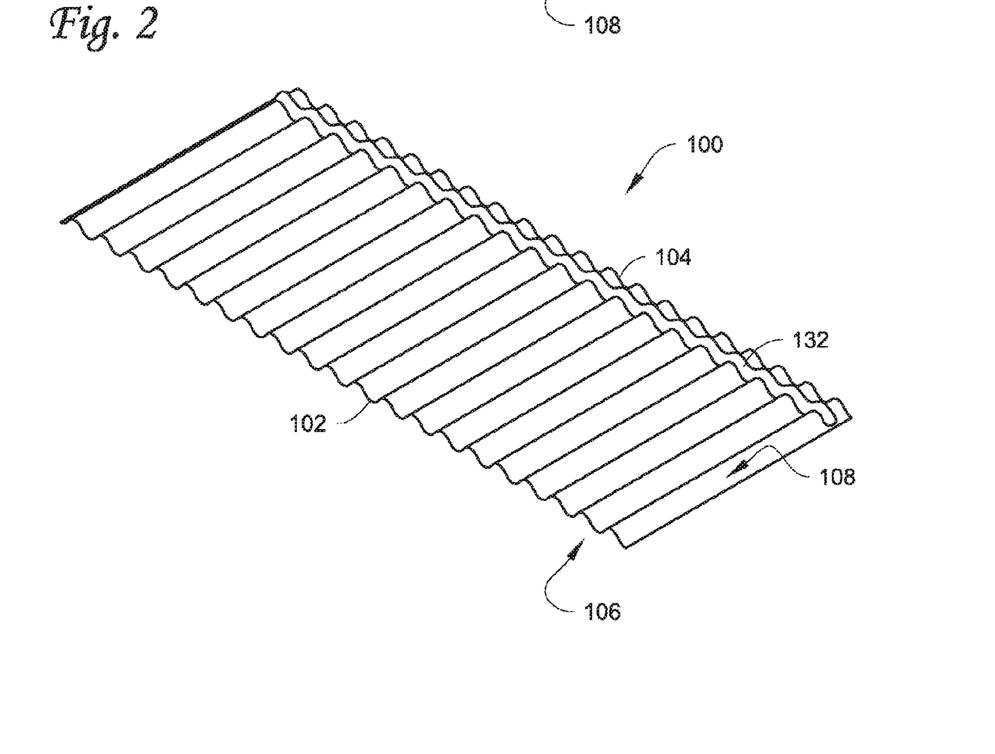
FIG. 2 is the opposite side of the example sheet of filter media of FIG. 1.

FIG. 1 depicts an example sheet of filter media 100 consistent with some examples of the technology disclosed herein, and FIG. 2 depicts the sheet of filter media 100 from the opposite surface. The sheet of filter media 100 has a first surface 106 and second surface 108. The sheet of filter media 100 is generally elongate and has a first elongate edge 102 and a second elongate edge 104. The sheet of filter media 100 defines a repeating wave pattern 110 defining flute peaks 112 alternating with flute valleys 114, where "flute peaks" and "flute valleys" is generally used herein to reflect that there are peaks that protrude in a first direction and peaks the protrude in the opposite direction. In the current example, the flute peaks 112 and flute valleys 114 are parallel.

The repeating wave pattern can be formed via fluting and/or corrugating manufacturing steps. The sheet of filter media 100 has a machine direction M that is generally the elongate direction, which is the direction that the media is linearly translated off from a spool of filter media and through a production line. In various embodiments, the sheet of filter media 100 is passed between two rollers in the machine direction to form the flute peaks 112 and flute valleys 114. The flute peaks 112 and flute valleys 114 alternate in the machine direction. Each of the flute peaks 112 and flute valleys 114 extends from the first elongate edge 102 to the second elongate edge 104. The first elongate edge 102 and the second elongate edge 104 extend in the machine direction M. The sheet of filter media 100 also has a cross-machine direction C, which is transverse to the machine direction M. The flute peaks 112 and the flute valleys 114 generally extend in the cross-machine direction C.

Figure 3:
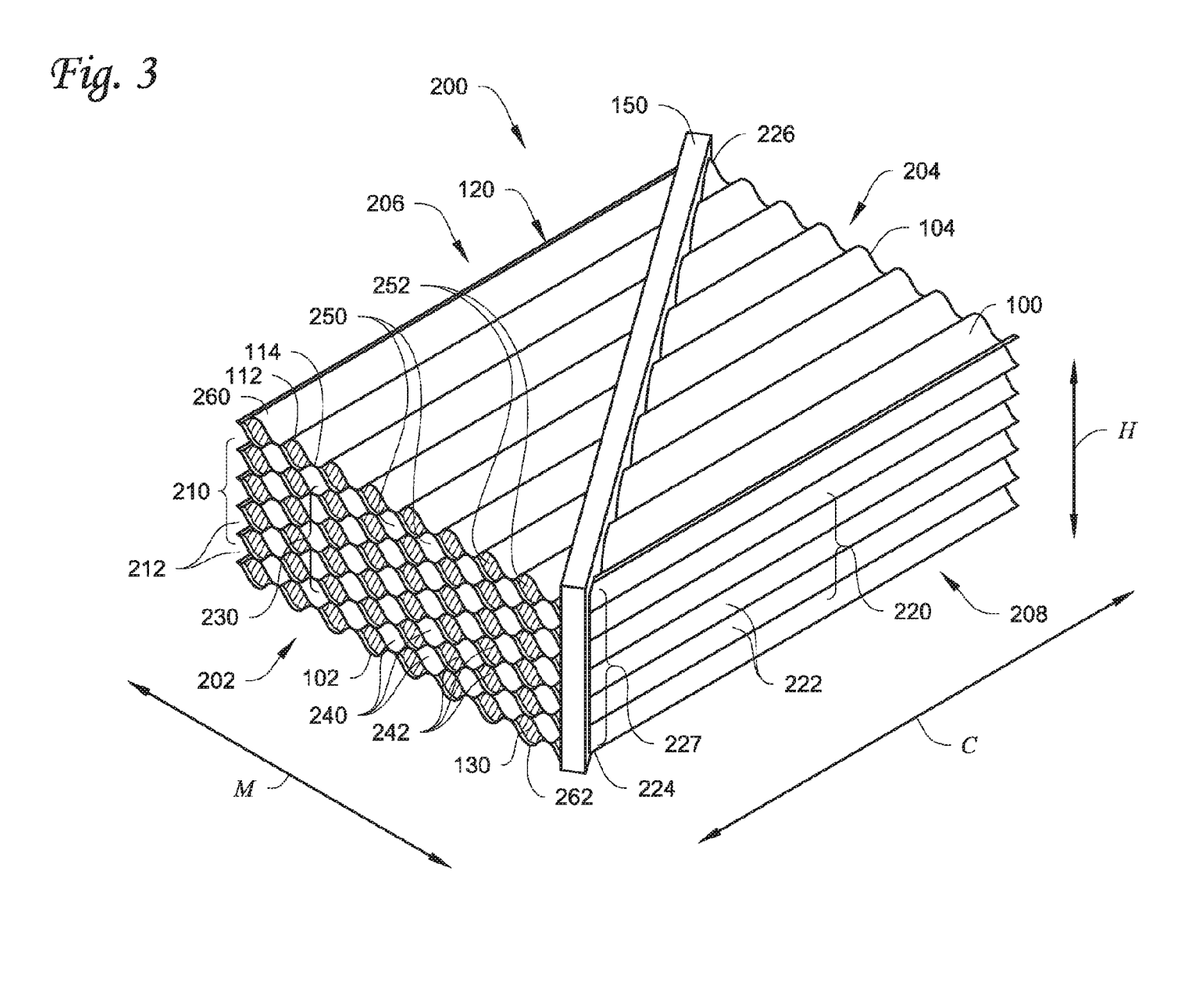
FIG. 3 is an example filter media pack incorporating the filtration media of FIGS. 1 and 2.
Figure 4:
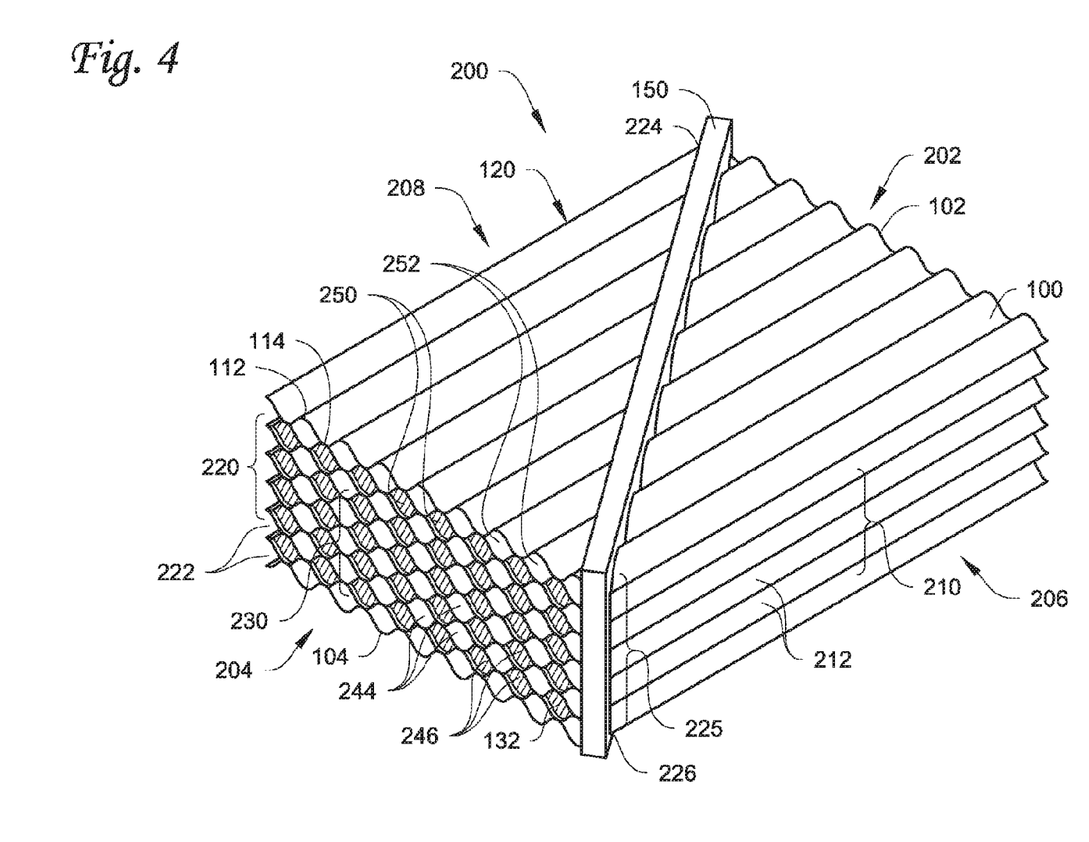
FIG. 4 is the opposite side of the example filter media pack of FIG. 3.

The sheet of filter media 100 of FIG. 1 can be pleated and formed into a media pack that is used to form a filter element of FIGS. 3 and 4, where FIG. 3 is a perspective view of one side of the filter element 200 and FIG. 4 is a perspective view of an opposite side of the filter element 200. The sheet of filter media 100 is pleated to form a media pack 120. The sheet of filter media 100 defines a plurality of pleats 230 extending between a first set of pleat folds 210 and a second set of pleat folds 220. In a variety of embodiments, each of the first set of pleat folds 210 and the second set of pleat folds 220 extend in the cross-machine direction C. The plurality of pleats 230 includes a first pleat 260 and a last pleat 262 of the media pack 120. Each of the plurality of pleats 230 extend from the first elongate edge 102 to the second elongate edge 104. It is noted that, in the pleating process, the orientation of a portion of the flute peaks and flute valleys change with respect to each other such that a flute peak in the un-pleated sheet of filter media can become a flute valley based on its orientation in the filter element 200 after the filter media 100 is folded at a pleat fold.

The filter element 200 has a first flow face 202 defined by the first elongate edge 102. The first flow face 202 defines a first plurality of flute openings 240 and a first plurality of flute closures 242. The media pack 120 similarly has a second flow face 204 (FIG. 3) opposite the first flow face 202, where the second flow face 204 is defined by the second elongate edge 104. The second flow face 204 defines a second plurality of flute openings 244 and a second plurality of flute closures 246. A first plurality of flutes 250 extends from the first plurality of flute openings 240 to the second plurality of flute closures 246. A second plurality of flutes 252 extends from the first plurality of flute closures 242 to the second plurality of flute openings 244. In this way, fluid passing from the first flow face 202 to the second flow face 204 through the first plurality of flute openings 240 must pass through the filter media 100 to exit the filter element 200 via the second plurality of flute openings 244.

The first plurality of flute closures 242 and the second plurality of flute closures 246 can be formed by sealing beads 130, 132 disposed along the elongate edges. Referring back to FIG. 1, a first sealing bead 130 is disposed on the first surface 106 extending along the first elongate edge 102. Referring back to FIG. 2, a second sealing bead 132 is disposed on the second surface 108 extending along the second elongate edge 104. The first sealing bead 130 can form the first plurality of flute closures 242 and the second sealing bead 132 can form the second plurality of flute closures 246.

The first sealing bead 130 and the second sealing bead 132 can be deposited on the respective surface of the filter media 100 through a variety of approaches including pumping the sealing bead material through a nozzle while linearly translating the elongate sheet of filter media 100 past the nozzle. The sealing beads 130, 132 can be a variety of different materials and combinations of materials. In some examples, the sealing beads 130, 132 are a hot melt adhesive. After pleating, the sealing beads 130, 132 can be cured through appropriate measures. In some embodiments the sealing beads 130, 132 are cured through application of heat, cold, drying, chemical or water application, or combinations thereof.

The filter element 200 also defines a third flow face 206. The third flow face 206 is perpendicular to the first flow face 202 and the second flow face 204. The third flow face 206 is defined by the first set of pleat folds 210. Between the respective pleat folds in the first set of pleat folds 210, the third flow face 206 defines a plurality of openings 212 that are in direct fluid communication with the first plurality of flutes 250, where "direct" fluid communication is used to mean "without intervening media/substrates." As such, the openings 212 defined at the third flow face 206 are in direct fluid communication with the first plurality of flute openings 240.

The filter element 200 also defines a fourth flow face 208 that is opposite the third flow face 206. The fourth flow face 208 is perpendicular to the first flow face 202 and the second flow face 204. The fourth flow face 208 is defined by the second set of pleat folds 220. Between the respective pleat folds in the second set of pleat folds 220, the fourth flow face 208 defines a plurality of openings 222 that are in direct fluid communication with the second plurality of flutes 252. As such, the openings 222 defined at the fourth flow face 208 are in direct fluid communication with the second plurality of flute openings 244.

The filter element 200 has a gasket 150 configured to sealably separate the first flow face 202 and the third flow face 206 from the second flow face 204 and the fourth flow face 208. In some embodiments, including that depicted, the gasket 150 defines a plane that lies at a 45-degree angle to the first flow face 202, the second flow face 204, the third flow face 206, and the fourth flow face 208. Stated differently, the first elongate edge 102 and the first set of pleat folds 210 defines first flow faces 202, 206, and the second elongate edge 104 and the second set of pleat folds 220 defines second flow faces 204, 208. One of the first flow faces and the second flow faces defines an inlet, and the other of the first flow faces and the second flow faces defines an outlet. The gasket 150 is sealably disposed between the first flow faces 202, 206 and the second flow faces 204, 208.

The gasket 150 is disposed diagonally across the plurality of pleats 230. In particular, the gasket 150 extends diagonally across the first pleat 260 and the last pleat 262 of the plurality of pleats 230. The gasket 150 is disposed along and abutting a first corner 224 of the media pack 120, where the first corner 224 is the intersection between the first flow face 202 and the fourth flow face 208. In other words, the gasket 150 is disposed along and abutting a first series of pleat fold ends 225 defined by the first set of pleat folds 210. The gasket 150 is also disposed along and abutting a second series of pleat fold ends 227 (FIG. 4) defined by the second set of pleat folds 220. The gasket 150 is disposed along and abutting a second corner 226 diagonally opposite the first corner 224. The second corner 226 is the intersection between the second flow face 204 and the third flow face 206. In a variety of embodiments, including the one depicted, the gasket 150 contacts the first sealing bead 130 and the second sealing bead 132.

Gaskets consistent with the technology disclosed herein can have a variety of configurations and constructions. In a variety of embodiments, the gasket is constructed of a sealing material such as an elastomeric material. In some embodiments the gasket is constructed of rubber. In some embodiments, the gasket is a sealing material that is over-molded to the media pack. In some embodiments the gasket is a pinch seal. In some embodiments the gasket is a radial seal. In some embodiments the gasket includes a frame component surrounding the sealing material of the gasket. The frame can be constructed of a rigid plastic or metal in some embodiments. In a number of embodiments, the frame can be configured to engage a filter housing. In a number of embodiments, the gasket can be over-molded to both the media pack and the frame.

In embodiments consistent with the current example, the gasket 150 can be applied across the first series of pleat fold ends 225 defined by the first set of pleat folds 210 and the second series of pleat fold ends 227 defined by the second set of pleat folds 220. The gasket 150 can also be applied diagonally across the first pleat 260 and the last pleat 262. Applying the gasket 150 can include positioning a mold around the media pack 120, such as across the first pleat 260 and last pleat 262 and across the first series of pleat fold ends 225 and the second series of pleat fold ends 227. The mold can define a cavity that extends around the media pack, such that the media pack isolates the mold cavity from the environment outside the mold. Gasketing material can be dispensed into the mold such that the gasketing material makes contact with the media pack and the mold. Then the mold can be separated from the gasketing material to form the gasket. In some examples, the first plurality of flutes 250 and the second plurality of flutes 252 are parallel. In some examples, the first plurality of flutes 250, the second plurality of flutes 252, and the pleat folds 210, 220 are parallel to each other. In various examples, the flute peaks 112, flute valleys 114, and pleat folds 210, 220 are parallel.

An advantage of the filter elements disclosed herein compared to filter elements where there is a single flow face that serves as an inlet and a single flow face that serves as an outlet is a reduction in the amount of material that is used to form the sealing beads 130, 132, which can reduce expense. One reason that there is a reduction in the amount of material that is used to form the sealing beads is because, in the current design, no sealing beads are dispensed on the faces of the media pack 260 defined by pleat folds 210, 220, whereas in some previous designs, sealings beads are disposed between the pleat folds to prevent fluid flow between the pleat folds. Also, a relative reduction in the use of sealing beads also results in a relative reduction in the filter media in contact with the sealing beads, meaning there is a relative increase in the amount of filter media that remains available for filtration.

Figure 5:
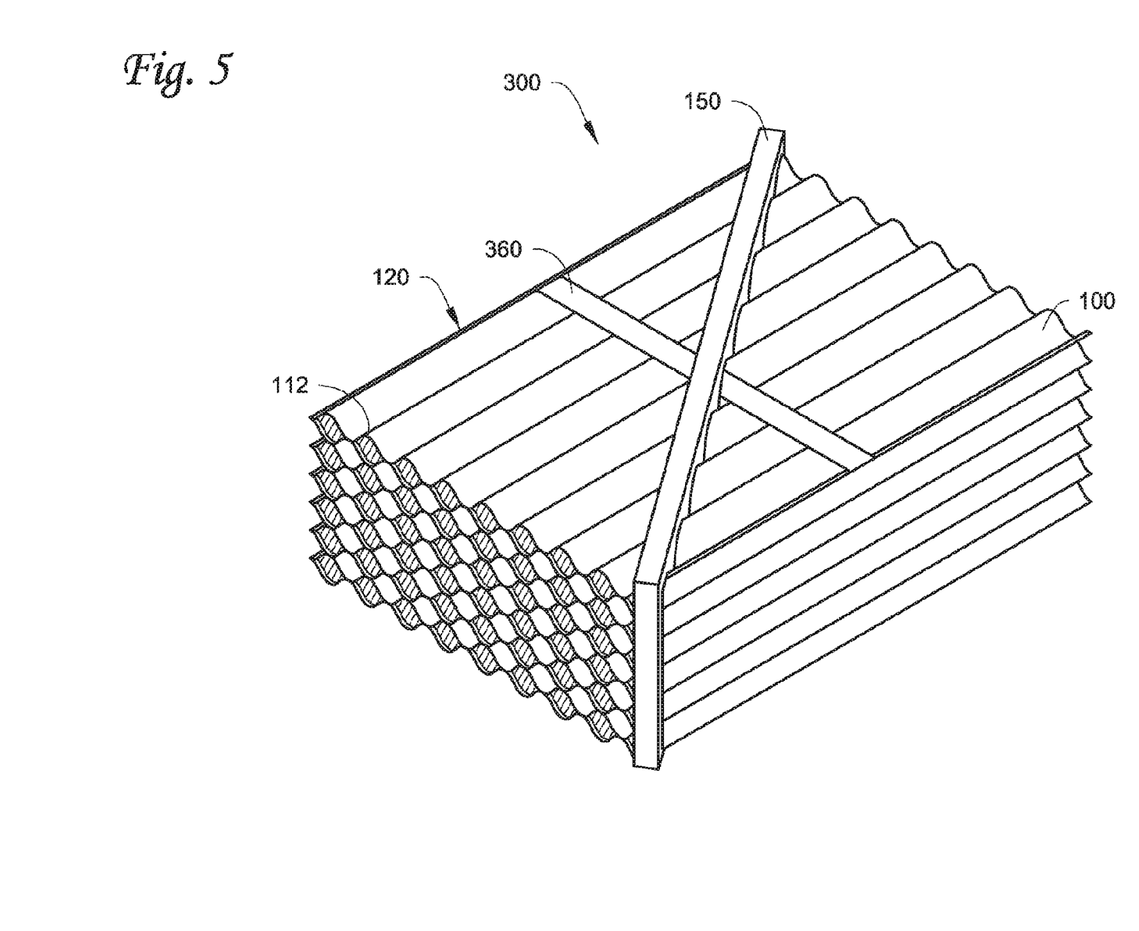
FIG. 5 is another example filter element consistent with some embodiments of the technology disclosed herein.

In some examples, such as that depicted in FIG. 5, a support strip 360 can be disposed across a plurality of flute peaks 112 to support the shape of the filter media 100 of the filter element 300. The example of FIG. 5 is otherwise consistent with the embodiments depicted in FIGS. 3-4. In some embodiments, including some consistent with FIG. 5, a support strip (not visible) can also be disposed across a plurality of flute valleys 114. The support strip(s) can be constructed of a variety of different materials and combinations of materials. In some embodiments the support strip is a narrow elongate strip of filter media. In some embodiments, the support strip is a narrow elongate strip of scrim material. In some embodiments the support strip is an elongate strip of cellulose material. Other types of support strips are certainly contemplated.

The support strip 360 can be coupled to each of the plurality of flute peaks 112. The support strip 360 can be coupled to each of the plurality of flute peaks 112 through a variety of approaches. In some embodiments, an adhesive is disposed across the support strip 360 and the support strip 360 is coupled to each of the plurality of flute peaks 112. In some embodiments, an adhesive is disposed across the plurality of flute peaks 112 and the support strip 360 is coupled to the adhesive disposed on the flute peaks 112. Other approaches can also be used.

Figure 6:
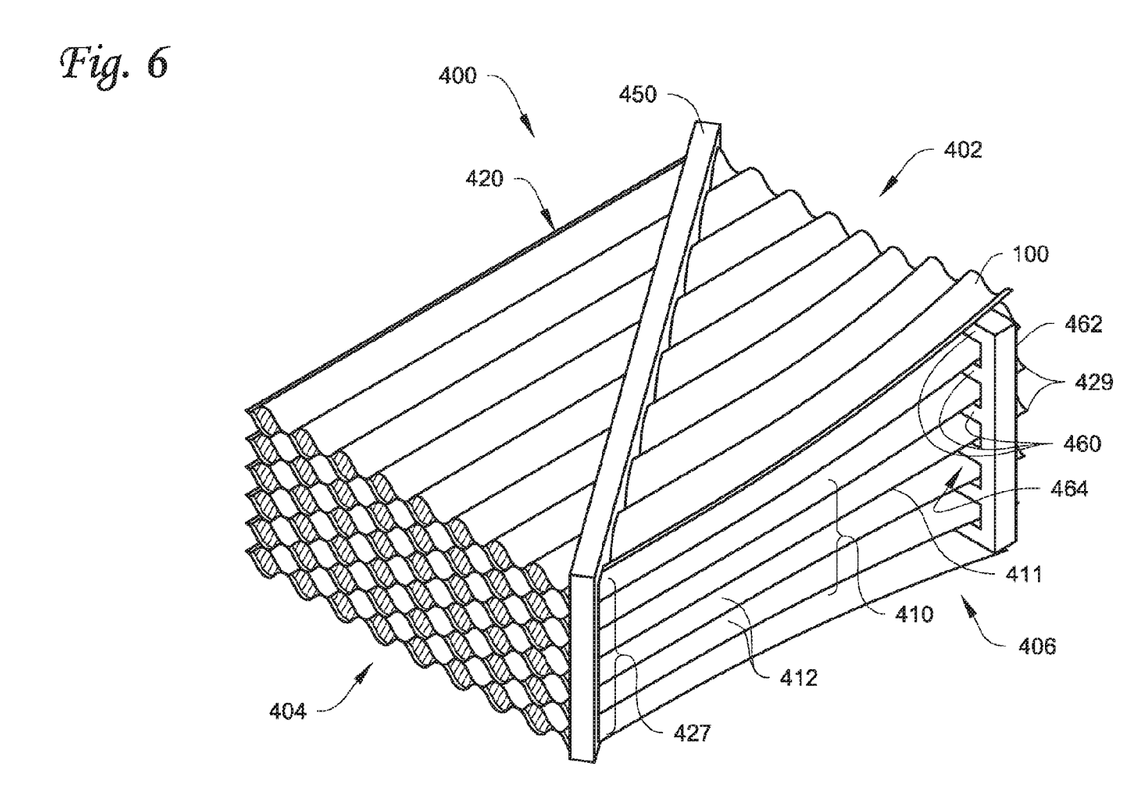
FIG. 6 is yet another example filter element consistent with some embodiments of the technology disclosed herein.

FIG. 6 depicts another example filter element 400 constructed of filter media 100 of FIGS. 1 and 2. The filter element 400 is generally consistent with embodiments of FIGS. 3-4, except a plurality of pleat spacers 460 extend between adjacent pleat folds. In a variety of embodiments, the plurality of pleat spacers 460 are inserted between adjacent pleat folds. In particular, each of the plurality of pleat spacers 460 extends into openings 412 defined at a third flow face 406 between adjacent pleat folds of a first set of pleat folds 410. The plurality of pleat spacers 460 can be configured to increase fluid flow through the third flow face 406.

In the current example, the plurality of pleat spacers 460 extend outward from a spacer body 462 and each gap 464 defined between the pleat spacers 460 are configured to receive a pleat fold 411. The spacer body 462 can have a variety of different configurations. In some embodiments, the spacer body 462 is a portion of a filter frame that extends around at least a portion of the filter element 400. In some embodiments, the spacer body 462 is a portion of a filter element housing such that the pleat spacers 460 are inserted into the openings 412 upon installation of the filter element in the filter element housing. In some example embodiments, the pleat spacers 460 can be components of the filter gasket 450.

While the first set of pleat folds 210 of FIG. 4 can be described as defining a rectangular plane, the first set of pleat folds 410 of the filter element of FIG. 6 define a curved plane. The first set of pleat folds 410 have a first series of pleat fold ends 427 and a second series of pleat fold ends 429. The first series of pleat fold ends 427 define a generally (i.e. not necessarily perfectly) straight line and the second series of pleat fold ends 429 define a curved line.

Some filter elements consistent with embodiments disclosed herein can incorporate a plurality of pleat spacers disposed at multiple faces of the filter element.

Figure 7:
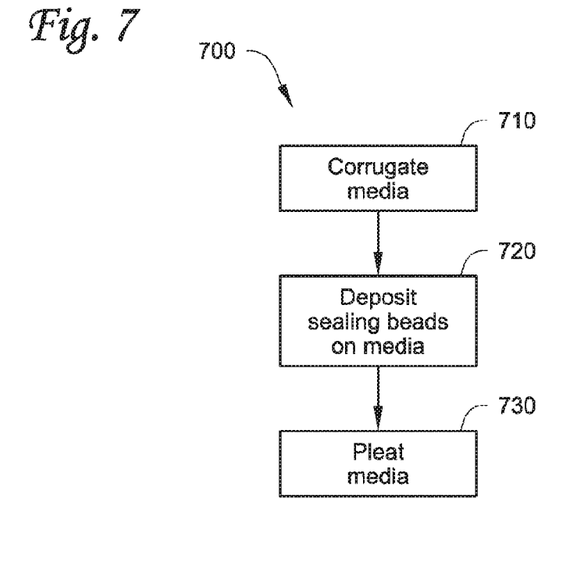
FIG. 7 is an example flow chart consistent with some embodiments.

FIG. 7 is an example flow chart consistent with some embodiments. The flow chart can be consistent with a method 700 used to construct filter elements consistent with the technology disclosed herein. Media is corrugated 710, seal beads are deposited on the media 720 and the media is pleated 730.

The media can be corrugated 710 through a variety of approaches. Generally, the media is an elongate sheet of media. Corrugating the media 710 can be accomplished by passing the media between two rollers in the machine direction of the media to form flute peaks and flute valleys that are alternating in the machine direction. The outer circumference of each of the rollers can define the general shape of the flute peaks and flute valleys to be imparted on the media. Alternative approaches to corrugating the media can be used.

The sealing beads are deposited on the media 720 such that a first sealing bead is deposited along a first elongate edge of the filter media on a first surface and a second sealing bead is deposited along a second elongate edge of the filter media on a second surface (see FIGS. 1-2, for example).

The media is pleated 730 to have a plurality of pleats extending between a first set of pleat folds and a second set of pleat folds (see media pack 120 of FIG. 3, for example). The pleat folds extend in the cross-machine direction. The media can be pleated 730 using machines such as a pleater, or through other approaches. In some embodiments, the pleat folds are formed at flute valleys 114 (FIG. 1) of the filter media. In some embodiments the pleat folds are formed at an intermediate point between a flute peak 112 and a flute valley 114 of the filter media. In some other embodiments the pleat folds are formed at flute peaks 112 of the filter media.

Figure 8:
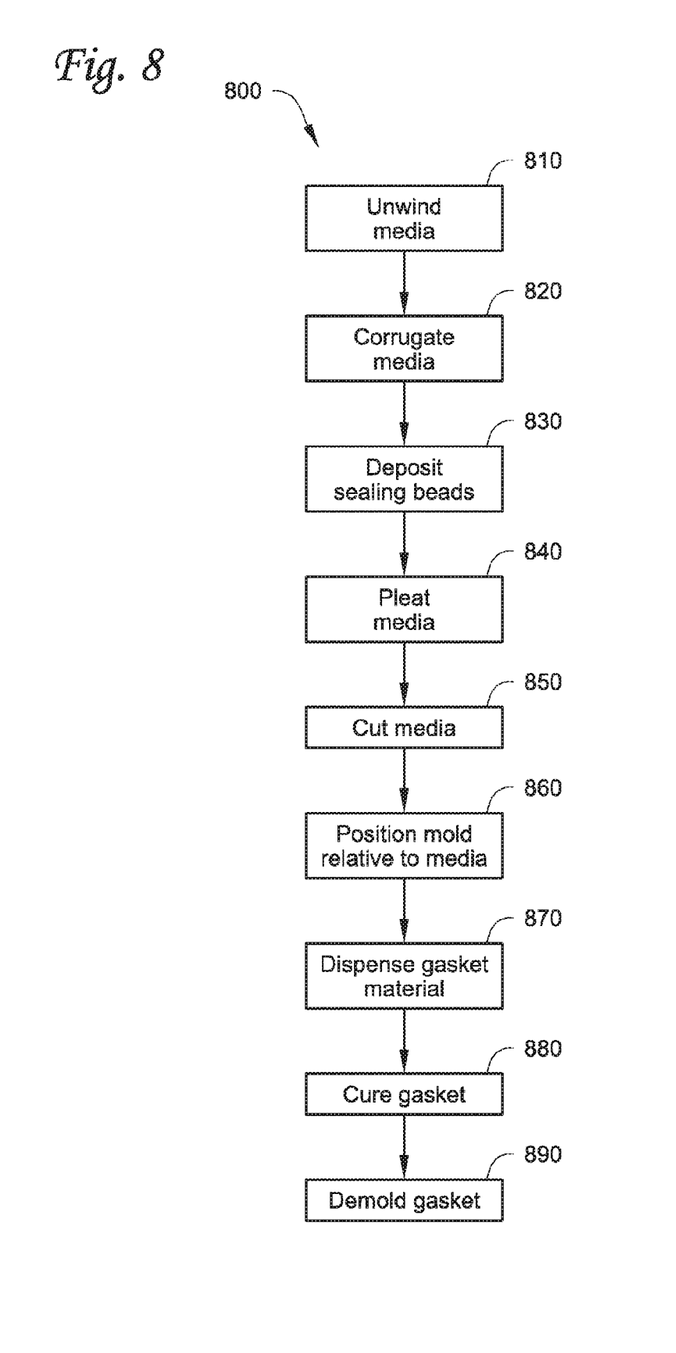
FIG. 8 is another flow chart consistent with some embodiments.

FIG. 8 is another flow chart consistent with some embodiments of the technology disclosed herein. Media is unwound 810 and corrugated 820. Seal beads are deposited on the media 830, the media is pleated 840 and the media is cut 850. A mold is positioned relative to the media pack 860 and gasket material is dispensed in the mold 870. The media/gasket is cured 880 and the gasket is demolded 890.

The media is generally unwound 810 from a spool or roll of filter media. The filter media can be wound about the spool for storage purposes, and unwound from the spool for manufacturing of filter elements. The filter media will generally be an elongate sheet of filter media that is wound about the spool in the machine direction of the media. The media can be corrugated 820 as has been described herein above. Seal beads are deposited on the media 830 and the media is pleated 840 also as described herein above.

The media is cut 850 such that the media pack 120 (see FIG. 3, for example) defines a height H resulting from the combined heights/thicknesses of each of the plurality of pleats 230, which are in a stacked configuration. The media can be cut 850 using a variety of types of cutting tools. In a variety of embodiments, the media is cut 850 at regular increments. In some embodiments, the media is cut 850 at a flute peak or a flute valley. In some embodiments, the media is cut 850 at an intermediate point between a flute peak and a flute valley. In some embodiments, the cut media is formed into a media pack, which can include compressing the pleats of the pleated media together to achieve the particular media pack height for the filter element. Forming the cut media into a media pack can also include curing the deposited sealing beads to form the flute closures in the media pack.

The mold is positioned relative to the media pack 860, for example, where the gasket is over-molded to the media pack. The mold is positioned relative to the media pack 860 at the desired location of the gasket 150 (FIG. 3, for example) in the resulting filter element. The mold can be positioned around the media pack, such as across a first pleat and a last pleat, and across the first series of pleat fold ends and the second series of pleat fold ends between the first flow faces and the second flow faces. The mold can define a cavity that extends around the media pack, such that the media pack isolates the mold cavity from the environment outside the mold.

Gasketing material can be dispensed into the mold 870 such that the gasketing material makes contact with the media pack and the mold. In a variety of embodiments, the gasketing material sealably contacts the media pack around the periphery of the media pack. The gasketing material is then cured 880. In some embodiments the media is also cured in the same process step, while in other embodiments only the gasket is cured. Curing the gasket 880 can be accomplished through a variety of means such as through heating, cooling, drying, application of chemicals or water, and combinations thereof.

The gasket can be demolded 890 such that the gasket remains in sealing contact with the media pack. The gasket can be demolded 890 through a variety of approaches such as by translating the mold away from the media pack while the media pack is anchored to a particular position. In some embodiments, the gasket is demolded 890 and then the gasket is cured. In some embodiments, the gasket is partially cured 880, the gasket is demolded 890, and then the gasket is fully cured.

Filter media consistent with the technology disclosed herein can be various types of filter media and combinations of types of filter media. In some embodiments the filter media incorporates cellulose fibers. In some embodiments the filter media incorporates polymeric fibers. The filter media can incorporate binders and/or resins among the filter media fibers. In some embodiments, the filter media lacks resin and incorporates binder fibers, such as bi-component binder fibers. In some embodiments the filter media is constructed of multiple layers of material such as a scrim material and a filter media layer, and can further incorporate multiple layers of filter media.

It should also be noted that, as used in this specification and the appended claims, the phrase "configured" describes a system, apparatus, or other structure that is constructed to perform a particular task or adopt a particular configuration. The phrase "configured" can be used interchangeably with other similar phrases such as "arranged", "constructed and arranged", "constructed", "manufactured and arranged", and the like.

All publications and patent applications in this specification are indicative of the level of ordinary skill in the art to which the present technology pertains. All publications and patent applications are herein incorporated by reference to the same extent as if each individual publication or patent application was specifically and individually indicated by reference.

This application is intended to cover adaptations or variations of the present subject matter. It is to be understood that the above description is intended to be illustrative, and not restrictive.

I claim:

1. A filter element comprising:
    a sheet of filter media having a first elongate edge and a second elongate edge;
    the sheet of filter media defining a plurality of pleats, a first set of pleat folds and a second set of pleat folds, wherein each of the plurality of pleats extend between the first set of pleat folds and the second set of pleat folds, wherein the first set of pleat folds each extend from the first elongate edge to the second elongate edge and the second set of pleat folds each extend from the first elongate edge to the second elongate edge,
    wherein each of the plurality of pleats defines a repeating wave pattern comprising flute peaks and flute valleys alternating from the first set of pleat folds to the second set of pleat folds, wherein each of the flute peaks and flute valleys extends from the first elongate edge to the second elongate edge.

2. The filter element of claim 1, wherein the first elongate edge and the first set of pleat folds defines first flow faces, and the second elongate edge and the second set of pleat folds defines second flow faces.

3. The filter element of claim 2, further comprising a diagonal gasket sealably disposed between the first flow faces and the second flow faces.

4. The filter element of claim 3, wherein the sheet of filter media has a first surface and a second surface, and the filter element further comprises a first sealing bead on the first surface and extending along the first elongate edge; and a second sealing bead on the second surface and extending along the second elongate edge.

5. The filter element of claim 4, wherein the diagonal gasket contacts the first sealing bead and the second sealing bead.

6. The filter element of claim 1, wherein the flute peaks and pleat folds are parallel.

7. The filter element of claim 1, wherein the first set of pleat folds defines a curved plane.

8. The filter element of claim 1, further comprising a plurality of pleat spacers extending between adjacent pleat folds.

9. The filter element of claim 1, further comprising a support strip extending across a plurality of flute peaks.

10. A method of forming a filter element comprising:
    passing an elongate sheet of filter media between two rollers in a machine direction of the media to form flute peaks and flute valleys alternating in the machine direction;
    depositing a first sealing bead along a first elongate edge of the filter media on a first surface;
    depositing a second sealing bead along a second elongate edge of the filter media on a second surface; and
    pleating the elongate sheet of filter media to have a plurality of pleats extending between a first set of pleat folds and a second set of pleat folds, wherein the first set of pleat folds and the second set of pleat folds extend in a cross-machine direction relative to the sheet of filter media.

11. The method of claim 10, wherein each of the flute peaks and flute valleys extend in the cross-machine direction.

12. The method of claim 10, wherein the pleat folds, the flute peaks, and the flute valleys are parallel.

13. The method of claim 10, further comprising applying a gasket diagonally across a first pleat and a last pleat of the plurality of pleats in the filter element.

14. The method of claim 13, further comprising applying the gasket across a first series of pleat fold ends defined by the first set of pleat folds and applying the gasket across a second series of pleat fold ends defined by the second set of pleat folds.

15. The method of claim 14, wherein applying the gasket comprises positioning a mold across the first pleat and the last pleat and across the first series of pleat fold ends and second series of pleat fold ends; and dispensing gasketing material into the mold.

16. The method of claim 10, further comprising coupling a support strip to each of a plurality of the flute peaks.

17. The method of claim 10, further comprising inserting a plurality of pleat spacers between adjacent pleat folds.

18. A filter element comprising:
    a first flow face defining a first plurality of flute openings and a first plurality of flute closures;
    a second flow face opposite the first flow face, wherein the second flow face defines a second plurality of flute openings and a second plurality of flute closures, wherein a first plurality of flutes extends from the first plurality of flute openings to the second plurality of flute closures and a second plurality of flutes extends from the second plurality of flute openings to the first plurality of flute closures;
    a third flow face perpendicular to the first flow face and second flow face, wherein the third flow face defines a plurality of openings in direct fluid communication with the first plurality of flutes;
    a fourth flow face opposite the third flow face, wherein the fourth flow face is perpendicular to the first flow face and the second flow face and the fourth flow face defines a plurality of openings in direct fluid communication with the second plurality of flutes; and
    a gasket configured to sealably separate the first flow face and the third flow face from the second flow face and the fourth flow face.

19. The filter element of claim 18, wherein the gasket defines a plane that lies at a 45-degree angle to the first flow face, the second flow face, the third flow face, and the fourth flow face.

20. The filter element of claim 18, further comprising a sheet of filter media having a first elongate edge and a second elongate edge, wherein the sheet of filter media defines a plurality of pleats, a first set of pleat folds and a second set of pleat folds, wherein each of the plurality of pleats extend between the first set of pleat folds and the second set of pleat folds.

* * * * *